Sept. 14, 1965  G. O. STRICKER ETAL  3,205,972
VIBRATION DAMPED CONSTRUCTIONS AND SOUND
DAMPING TAPES USED THEREIN
Filed July 10, 1961  2 Sheets-Sheet 1

ADHESIVE AT NODAL POINTS.
CREPED PARCHMENT BETWEEN ADHESIVE AND PANEL.
DECAY RATE APPROXIMATELY AT 30 DB PER. SEC.

INVENTORS
George O. Stricker
Raymond F. Wollek

By: Wallenstein, Spangenberg & Hattis
Attys

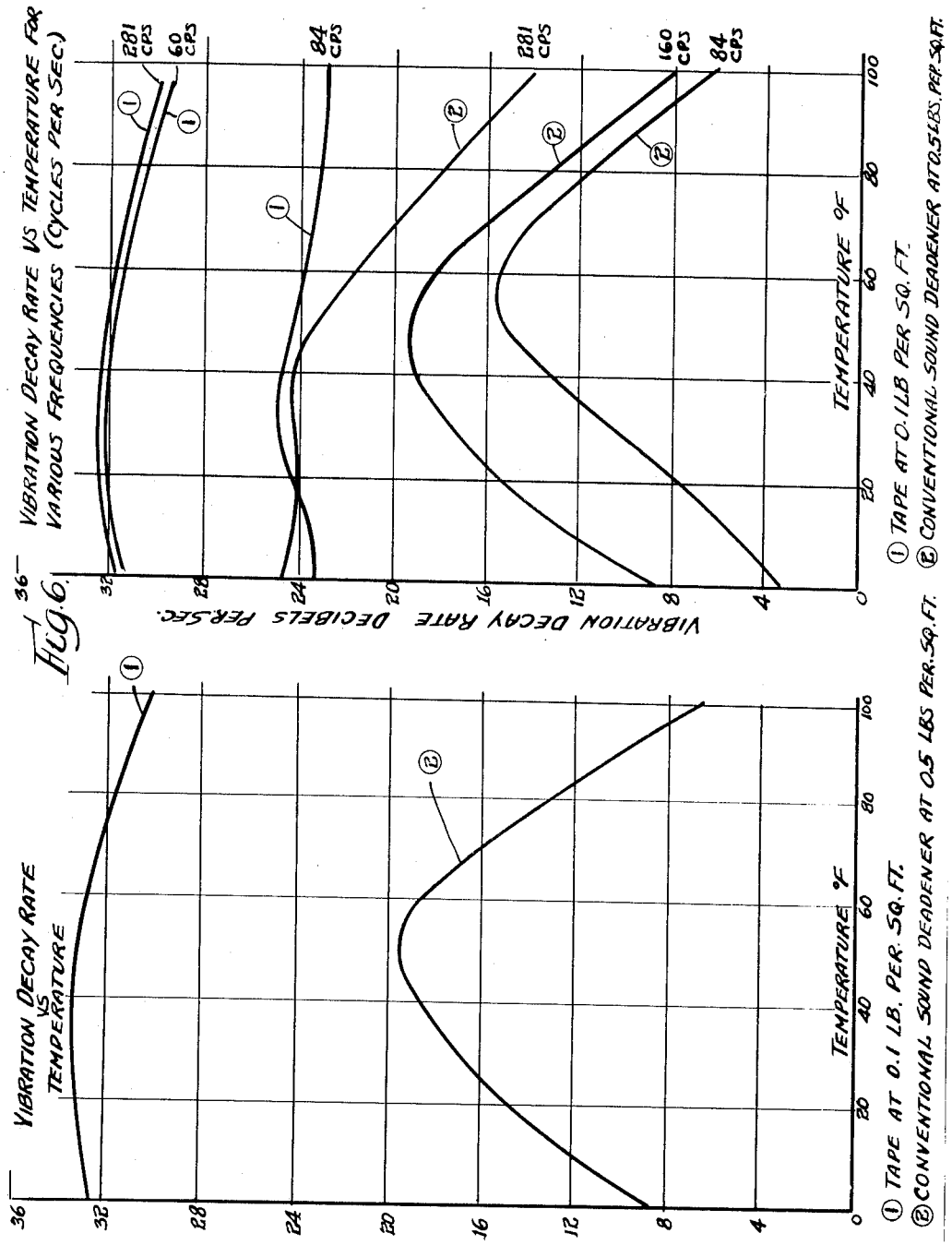

3,205,972
VIBRATION DAMPED CONSTRUCTIONS AND SOUND DAMPING TAPES USED THEREIN
George O. Stricker, Midlothian, and Raymond F. Wollek, Chicago, Ill., assignors to Daubert Chemical Company, Chicago, Ill., a corporation of Illinois
Filed July 10, 1961, Ser. No. 122,716
16 Claims. (Cl. 181—33)

Our invention is concerned with sound damping and relates particularly to sound damping materials in tape or relatively narrow sheet form (hereafter for convenience referred to generically as tape or tapes) and the utilization thereof for damping sound vibrations in numerous environments, all as is hereafter described in detail.

The damping, deadening or absorption of sound vibrations is a problem to which a great deal of attention has been given for a long period of time by those versed in the art. Typical of approaches thereto are shown by such illustrative U.S. Patents as Nos. 1,628,090; 1,928,034; 2,087,248; 2,355,568; 2,386,502; 2,534,137; and 2,819,032. Some of the difficulties with various heretofore known prior art practices and proposals, such as excessive weight, unwieldy thicknesses, high equipment costs, difficulty in application, and limited effectiveness are outlined in the aforementioned U.S. Patent No. 2,355,568. Possibly the most widespread current use of sound damping or sound deadening materials is in the form of spray-on coatings.

In more recent years, in an effort to reduce weight and for other reasons as well, vibration damping tapes have been suggested and utilized in the art, reference thereto being made, for example, in the aforesaid U.S. Patent No. 2,819,032. Typical of such vibration damping tapes is one comprising an aluminum foil backing of about 0.0017 inch thickness laminated with a pressure-sensitive adhesive to an unbleached cotton cloth, utilizing a rubber-base pressure-sensitive adhesive. Such vibration damping tape is attached to the thin sheet metal panels where sound is transmitted through the panels by the vibration of the panels themselves. The aluminum foil is separated from the sheet metal panel to which it is attached by an approximately 14 mil. thickness of adhesive and cloth, and the mechanism of the sound dampening is alleged to result from the existence of a so-called "truss" effect which adds to the stiffness of the metal panel and which combines with the natural absorbing qualities of the rubber forming the base of the adhesive.

One of the main difficulties with sound dampening tapes heretofore known in the art, and of the type described above, is that their sound damping properties are far too inadequate. This may, for example, be seen in connection with the well known and frequently utilized Geiger sound attenuation test. This test, which measures the decay rate of vibrational noise induced in a steel panel, is referred to in the aforementioned U.S. Patent No. 2,386,502. It comprises, generally speaking, supporting, at its nodal points, a 20″ x 20″ x ¼″ cold rolled steel panel having a natural resonant frequency of 160 cycles per second, then electromagnetically exciting said panel to its resonant frequency, then discontinuing said excitation, and measuring the time elapsed for a 10 decibel drop off in sound intensity. The decay rate is reported in decibels per second. In a typical series of measurements, in accordance with the aforesaid Geiger test, the decay rates of the bare metal panel, measured at 10 degrees F. intervals beginning at 0 degree F. and ending at 100 degrees F., ranged from 1.20 to 1.02 decibels per second. Utilizing the metal panel to which the sound dampening tape was applied, the decay rates, under the same temperature interval conditions, ranged from 4.73 to 1.90 decibels per second. The differences in the decay rates of the bare metal panel and the metal panel to which the sound damping tape was applied, at any given temperature within the range at which testing was done, represents the sound damping effect of the tape. As will be pointed out hereafter in detail, the sound damping effects obtained by sound damping tapes made in accordance with our present invention are several fold as great as those obtainable with presently known tapes such as described above, indeed, in certain cases, of the order of 3 to 5 times as great or even greater.

In accordance with our invention, a unique sound damping tape is provided which advantageously comprises a base or backing member, especially a flexible base or backing member of which thin aluminum foil laminated on one side to kraft paper, represents a particularly preferred embodiment. The said base member carries, on its paper side, a layer of an energy or sound dissipative material which may be provided with an adhesive on its surface but which, especially desirably, is itself an adhesive body possessing a tacky surface in the manner of a pressure-sensitive adhesive. The energy or sound dissipative material is advantageously laid down in a continuous body to cover the length and width of the base member. In certain cases, it may be desirable, but it is usually unnecessary, to apply a primer coating on the base member to improve the bonding thereto of the energy or sound dissipative material. In any event, non-adhesive sheets or so-called conversion materials, exemplified particularly by creped paper, are then disposed longitudinally of the tape in spaced apart relationship whereby to leave spaced areas, particularly intermediate spaced areas, of the adhesive-surfaced energy or sound dissipative material. In its usual form, the tape is characterized by alternate areas of adhesive and non-adhesive conversion material.

In the particularly preferred embodiment of our invention, the sound damping tape base member is made of an aluminum metal or alloy foil (hereafter for convenience referred to simply as aluminum foil) which advantageously is laminated on one side to a thin paper sheet. Metal foil thicknesses may vary considerably but it is preferred to use metal foils of thicknesses of the order of 0.25 to 0.4 mil. In place of aluminum foil, although much less economical, other metal foils can be used such as those made from alloys of magnesium, titanium, copper and beryllium. In the broader aspects of our invention, no metal foil at all is required; and while base members other than metal foils can be used such as of cellulose or cellulose derivatives or synthetic plastics, it is also within the broader purview of the invention to produce sound damping tapes which do not utilize any separate base or backing member.

The energy or sound dissipative adhesive material is most desirably, particularly from the standpoint of economy, a mastic which is inherently tacky or adhesively pressure-sensitive, that is, possesses the ability to adhere, and particularly desirably to adhere very firmly, to the metal sheet, panel or like surface simply by pressing against surface with hand or analogous pressure. Such mastics are well known in the art and are readily available for selection. Mastics that we have found to be very satisfactory, and this is mentioned solely by way of illustration and not limitation, have the following compositions, the parts listed being by weight:

Example A

| | |
|---|---|
| Polybutene (av. M.W. 1100 to 1200) (viscosity 125,000 to 140,000 SUS at 100 degrees F.) ("Oronite 32" or "Indopol H–300") | 18 |
| Natural rubber hydrocarbon | 15.5 |
| Rubbery copolymer of isoprene and isobutylene | 20 |
| Calcium carbonate (325 mesh) | 30.5 |
| Asbestos (7T grade-short fibre) | 15.5 |
| Vegetable fatty acid (Archer-Daniels-Midland Fatty Acid No. 105—acid value from 195 to 205) | 0.5 |

Example B

| | |
|---|---|
| Polybutene ("Indopol H–100"—Amoco Chemical Company) | 21.5 |
| Rubbery copolymer of isoprene and isobutylene | 26 |
| Calcium carbonate (325 mesh) | 35 |
| Asbestos (7T grade-short fibre) | 14.5 |
| Aromatic petroleum plasticizer ("A.P. 25"—Pennsylvania Refining Company) | 2 |
| Amine wetting agent ("Redicote T"—Armour & Company) | 1 |

Such mastics, when applied to an aluminum foil backing or the like in the practice of our invention, retain their pressure-sensitive adhesive properties over substantial periods of time and delamination does not occur over wide ranges of temperature as, for example, from −20 degree F. to 400 degrees F.

Other energy or sound dissipative pressure-sensitive adhesive materials which are of non-mastic character and which possess low cold-flow properties can, of course, be utilized. In general, they desirably contain rubber or rubber-like materials of natural or synthetic character, illustrative examples of which comprise polyisobutylene of high molecule weight, polyvinyl chloride, natural gum, Buna rubbers, neoprene, butyl rubbers and the like.

While, as stated above, the utilization of adhesive mastics is especially desirable as the energy or sound dissipative material, in those instances where slow creep of the sound damping tapes may tend to occur with the mastics and it is desired to avoid the same, various elastomers or asbestos cloth can be used. In such cases, the adhesive may be applied to the said elastomers or asbestos cloth only where fixed contact with the vibrating metal surface is desired. While pressure-sensitive adhesives are especially desirable, as pointed out above, it is also within the broader phases of our invention to utilize heat- or solvent-activated adhesives which possess strong adherence properties and which have little or no flow characteristics with age. Such adhesives are, per se, well known in the art, and may comprise elastomer-resin compositions or, where high temperature use is involved, may comprise silicate or other inorganic based adhesives.

The conversion materials, representing the non-adhesive areas, which aid in converting vibrational energy to thermal energy, are most advantageously striated or creped materials. Especially satisfactory are creped parchment papers. The stiffness, thickness and permanence of crease retention in said creped parchment papers influence to some extent the exact sound damping effects obtained but there is nothing critical in the exactitude of these characteristics. Conventional, commercially marketed creped parchment papers have been utilized in the practice of the present invention with excellent results. Other striated or creped materials such as creped glassine papers, high wet-strength creped papers such as resin-impregnated creped papers where the environment in which the damping tapes or sheets are such that the paper may become wet, calendered crepe papers, creped fabrics, or other creped cellulosic and non-cellulosic materials can be utilized. Where high temperatures may be encountered, creped fiber glass can be utilized. In the broader aspects of our invention, the conversion materials may be relatively smooth surfaced and may comprise paper, paper-coated burlap, resin-impregnated papers, parchment papers, glassine papers, fiber glass, polyurethane foams and polystyrene foams of the order of 1/8" thickness, and the like. However, as previously stated, creped or similar uneven surfaced conversion materials produce outstandingly satisfactory results and, therefore, are distinctly preferred. Creped papers having from 15 to 65 crepe lines per lineal inch are illustrative of those which can very effectively be used in the production of the sound damping tapes of our invention.

The widths of the sound damping tapes of our invention are variable. Generally speaking, it is desirable to utilize tapes ranging in width from about one inch to about six inches, particularly satisfactory being tapes having widths in the range of about one to about two inches. Some variation in sound damping occurs with changes in width, other factors being equal.

The thickness of the energy or sound dissipative material used in the sound damping tapes of our invention is subject to substantial variation. Generally speaking, it should desirably range in thickness from about 1/8 inch to 3/8 inch, particularly where an adhesive mastic is utilized, but it may vary appreciably from these values, although if the thickness is relatively substantial the tapes cannot satisfactorily be marketed or distributed in the form of rolls.

The spacings of the adhesive areas and non-adhesive conversion material areas are also variable. To some extent, this will be governed, where optimum sound damping is sought, by such factors as the stiffness of the tape, the nature of the non-adhesive conversion material, and the frequency of the sound being damped. Generally speaking, each segment of the non-adhesive conversion material is advantageously from about one inch to four inches in length and the alternate adhesive areas may likewise be of a similar range of lengths. The adhesive areas should be of sufficient lengths to insure a good adhesion of the sound damping tape to the metal sheet or panel to which it is to be attached. The non-adhesive conversion material need not extend along the entire width of the tape or the mastic or other energy or sound dissipative material although it may do so, but it should extend over a major part of such width and advantageously over about 80% and better still over about 85% of said width. Thus, in the case of an illustrative sound tape made pursuant to our invention in which the width of the tape is 1½ inches and the length of the adhesive areas and non-adhesive creped parchment paper conversion areas is from 3 to 3¼ inches, the width of the parchment paper is desirable about 1¼ inches to 1⅜ inches.

Where the damping tapes of our invention are marketed in the form of rolls, it is especially desirable, and in certain cases necessary, but depending upon the adhesive nature of the exposed surface of the energy or sound dissipative material, to provide a release coating on the metal foil or other base or backing member where such a base or backing member is utilized. It may, likewise, be desirable to employ a release coating where the tapes are marketed in flat form as by vertically stacking a plurality of tapes face to back in a box or carton or like container in order to prevent undue sticking together of the individual flat tapes. It will be understood, however, that the utilization of a release coating in the environment involved is not critical to the structural features of our sound damping tapes which account for the exceptional results which are achieved with reference to sound or vibration damping. Where a release coating is desired, it may be selected from various of those on the commercial market, many of which comprise silicone based compositions.

The sound damping tapes of our invention provide a number of important advantages over prior practices of effecting sound damping of sheet metal or articles made therefrom, including significant advantages over heretofore known sound damping tapes. They can be made to be quite thin and light in weight. Thus, for instance, in an illustrative case, 54 pounds of a sound damping tape made pursuant to our present invention produces twice the sound damping efficiency of 735 pounds of a heretofore conventionally used spray-on coating. Compared to such sound damping tapes as have previously been known in the art, this sound damping tape of our invention was three times as effective in reducing sound vibrations in a given steel panel. Another advantage of the sound damping tapes of our invention is their relatively low cost, and their ease of application in that they require no special production line techniques nor costly equipment, thus bringing about savings in installation and labor. In relation to spray-on coatings, the sound damping tapes of our invention are easier and safer to handle in that there are no heavy drums to handle and there are no solvent fire hazards. Again, in relation to spray-on coatings, the sound damping tapes of our invention require much less storage space. By way of illustration, 3 cubic feet of storage area are required to warehouse two cases (each case containing 6 fifty foot rolls, 1½" wide and ³⁄₃₂" thick) of a typical sound damping tape of our present invention, whereas, by contrast, 12 cubic feet are required for one drum of spray-on material.

Referring, now, to the drawings, in which, among other things, an illustrative, but particularly preferred, embodiment of our invention is shown:

Figure 4:
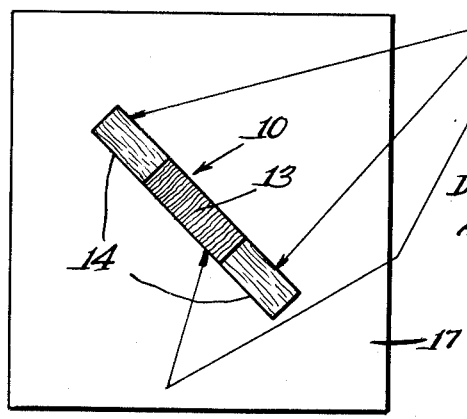

FIG. 4 is a plan view showing a simple form of application to a steel panel of a sound damping tape with the backing of the tape and adhesive portions removed to show spaced adhesive and non-adhesive areas, and made in accordance with our invention; and FIGS. 5 and 6 are graphs illustrating vibration decay rates of sound damping tapes made pursuant to our invention, in comparison with such rates of a typical commercially marketed spray-on type of sound damping or deadener composition.

Figure 1:
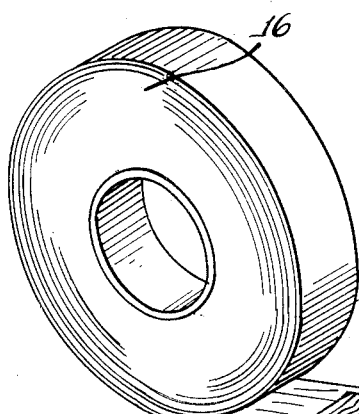
FIG. 1 is a perspective view, in roll form, of a sound damping tape made in accordance with our invention.
Figure 2:
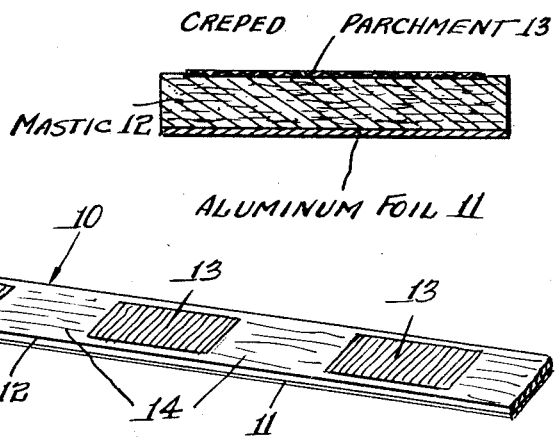
FIG. 2 is a sectional view, in enlarged form for convenience of illustration, taken along the line 2—2 of FIG. 1.
Figure 3:
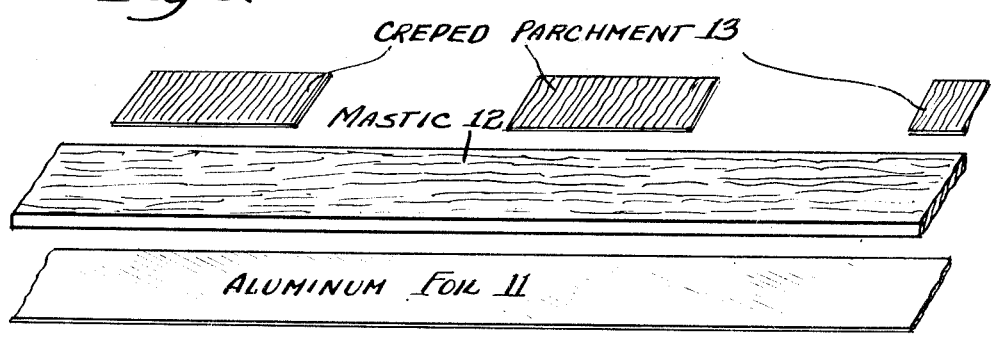
FIG. 3 is an exploded perspective showing the separate parts making up the illustrative sound damping tape shown in FIGS. 1 and 2.

As shown in FIGS. 1, 2 and 3, the sound damping tape, generally indicated by numeral 10, includes a paper laminated aluminum foil base or backing 11 upon the paper side of which there is supported, in adhering relation to said base or backing, an energy or sound dissipative tacky mastic composition 12. Spaced sections or sheets 13 of creped parchment paper overlie the mastic composition and adhere firmly thereto by reason of the adhesive or tacky nature of said mastic composition. The sections or sheets 13 are spaced apart from each other longitudinally of the tape 10 to leave spaced areas of adhesive 14 which alternate with spaced areas of said sheets 13. The sound damping tape is rolled upon itself to form a roll 16. The exterior surface of the foil base or backing 11 is provided with a thin release coating (not shown).

In FIG. 4, where a simple illustration is given of one form of application of the sound damping tape to a sheet of steel, the tape 10 is applied diagonally of the sheet of steel 17 with the adhesive portions 14 placed at approximately the nodal points of the steel sheet, the intermediate creped paper section 13 lying flat against and in close contact with the surface of said steel sheet.

In FIGS. 5 and 6, graphs are shown in which vibration decay rates are measured against temperature, in FIG. 5, and against temperature for various frequencies, in FIG. 6, in the case of a sound damping tape made in accordance with our invention and in the case of a typical commercial spray-on sound deadener. Despite the fact that, in the case of our sound damping tape, it was used in an amount of 0.1 pound per square foot of steel sheet, and the spray-on sound deadener was used in an amount equal to five times the weight of our sound damping tape per square foot of steel sheet, the use of our sound damping tape resulted in very materially greater vibration decay rates. Furthermore, the vibration decay rates remained relatively constant at all temperatures in the range of 0 to 100 degrees F., showing little drop even at 100 degrees F., whereas, in sharp contrast, in the case of the spray-on sound deadener, there was a rise in decay rates in the temperature range of 0 to about 50 degrees F. followed by a clear drop in decay rates in the range of about 50 to 100 degrees F.

The sound damping tapes of our present invention have a wide scope of uses. Thus, by way of example, they can be used in such environments as automobile doors, panels, firewalls, hoods and trunk lids; aircraft fuselages and empennage panels; refrigerators, television cabinets, steel desks, filing cabinets, appliance cabinets, commercial and kitchen cabinets, business machine cabinets, heating and ventilating ducts, metal roofing, siding panels, stainless steel sinks, air conditioners, washing machines, trucks, railroad cars, and the like.

In the utilization of the sound damping tapes of our invention, they can be applied in the same manner that sound damping tapes of the prior art have been used. They can, for example, be applied to selected areas of either one or both sides of metal sheets or panels, or several tapes may be superimposed on the tape which is attached to the metal sheet or panel. Generally speaking, in various instances, best results appear to be obtained where the adhesive portions are firmly applied at or approximately at nodal points of the metal sheets or panels or like members with the non-adhesive creped paper or the like in face to face contact with said metal sheets or panels or like members mainly at their anti-nodal points. The tape, if not pre-cut to desired size, can be cut from a roll thereof, to the desired length or footage, and pressed directly against the metal surface at the desired area or areas thereof. It will, thus, be seen that it is unnecessary to cover entire metal surface areas as is the case with spray-on sound damping compositions. In terms of the aforementioned Geiger test, vibration decay rates have been obtained, utilizing damping tapes made in accordance with our invention, of the order of 30 or more decibels per second.

The exact mechanism of the sound damping or deadening action of the tapes of the present invention has not fully been ascertained. It appears, however, from various tests and studies which have been carried out that it is not due to such effects as lateral surface friction between the tape and the metal sheet or panel, internal friction due to flexure of mastic or other sound dissipative adhesive materials, or interference or wave pattern interference due to mass location of the damping tape on the metal sheets or panels. It is possible, though by no means certain, that our sound damping tapes exert their sound damping effects by reason of collision or intermittent contact of the non-adhesive, particularly striated or creped, paper or the like with the vibrating portions of the metal sheets or panels, or through friction due to flexure of said non-adhesive conversion material portions of said tapes, or by reason of a resilient deformation of said conversion material. There are indications that the creped paper portions of the damping tapes slap against or strike the vibrating metal sheets or panels thereby bringing about a rapid decrease in the amplitude of vibration; and also that the creped paper or the like possesses a spring-like or springy action which allows the damping tape to vibrate out of phase with the metal sheet or panel, again thereby bringing about a rapid decrease in the amplitude of vibration of the metal sheet or panel. Most likely, the reasons for the unique functioning of our sound damping tapes are due to a combination of two or more of the foregoing mechanisms.

What we claim as new and desire to protect by Letters Patent of the United States is:

1. A vibration damped construction comprising in combination a vibratable panel, or the like, and a sound damping tape carried on only a limited area thereof, said tape comprising an elongated, pliable laminate including a continuous, elongated strip of appreciable thickness of a sound dissipative adhesive material, a backing strip adhesively adhered to one side of said strip of sound dissipative adhesive material, a non-adhesive conversion material adhesively adhered to the other side of said strip of sound dissipative adhesive material, the exposed surface of said other side of said strip of sound dissipative adhesive material longitudinally having alternate relatively narrow exposed surfaces of sound dissipative adhesive material and longer exposed surfaces of said non-adhesive conversion material, said alternate exposed surfaces of sound dissipative adhesive material adhesively maintaining the laminate on the panel, or the like.

2. A vibration damped construction comprising metal in sheet or panel form subject to vibration in use and carrying on only limited areas of its surface at least one tape, said tape comprising a layer of a sound dissipative material to a surface of which is adhered at least one area of non-adhesive conversion material which covers at least mainly the entire width of the said surface of said sound dissipative material, said area or areas of non-adhesive conversion material being disposed longitudinally of the tape between exposed longitudinally spaced areas which are adhesive-surfaced, said tape being adhered to the aforesaid limited areas of the surface of the metal in sheet or panel form through said exposed longitudinally spaced adhesive-surfaced areas with said non-adhesive conversion material lying substantially flat against the surface of the metal sheet or panel.

3. A vibration damped construction comprising metal in sheet or panel form subject to vibration in use and carrying on only limited areas of its surface at least one tape, said tape comprising a flexible tape base carrying a layer of a sound dissipative material on its surface, said sound dissipative material having adhered to its exposed surface a series of areas of non-adhesive creped paper covering at least mainly the entire width of the surface of said sound dissipative material, said creped paper areas being spaced from each other longitudinally of the tape to leave intermediate exposed longitudinally spaced areas of said sound dissipative material, said intermediate exposed longitudinally spaced areas being adhesive-surfaced, said tape being adhered to the aforesaid limited areas of the surface of the metal in sheet or panel form through said intermediate exposed longitudinally spaced adhesive-surfaced areas with said non-adhesive creped paper areas lying substantially flat against the surface of the metal sheet or panel.

4. A vibration damped construction comprising metal in sheet or panel form subject to vibration in use and carrying on only limited areas of its surface at least one tape, said tape comprising a flexible tape base carrying a layer of a sound dissipative material covering essentially the entire width of its surface, said sound dissipative material having a tacky adhesive exposed surface overlying which is at least one area of non-adhesive creped paper covering at least mainly the entire width of said sound dissipative material, said creped paper area or areas being disposed longitudinally of the tape between exposed longitudinally spaced areas of said tacky adhesive, said tape being adhered to the aforesaid limited areas of the surface of the metal in sheet or panel form through said exposed longitudinally spaced areas of tacky adhesive with said non-adhesive creped paper area or areas lying substantially flat against the surface of the metal sheet or panel.

5. A vibration damped construction comprising metal in sheet or panel form subject to vibration in use and carrying on only limited areas of its surface at least one tape, said tape comprising a metal foil tape base carrying a layer of a tacky adhesive mastic covering essentially the entire width of its surface, said tacky adhesive mastic being provided with overlying areas of non-adhesive striated material covering at least the major part of the width of the tacky adhesive mastic, said non-adhesive striated material areas being spaced from each other longitudinally of the tape to leave intermediate exposed longitudinally spaced areas of said tacky adhesive mastic, said tape being adhered to the aforesaid limited areas of the surface of the metal in sheet or panel form through said intermediate exposed longitudinally spaced areas of tacky adhesive mastic with said non-adhesive striated material areas lying substantially flat against the surface of the metal sheet or panel.

6. A vibration damped construction comprising metal in sheet or panel form subject to vibration in use and carrying on only limited areas of its surface at least one tape, said tape comprising an aluminum foil tape base carrying a layer of a tacky adhesive mastic covering essentially the entire width of its surface, said tacky adhesive mastic being provided with overlying areas of non-adhesive creped parchment paper covering at least mainly the entire width of the tacky adhesive mastic, said non-adhesive creped parchment paper areas being spaced from each other longitudinally of the tape to leave intermediate spaced areas of said tacky adhesive mastic, said tape being adhered to the aforesaid limited areas of the surface of the metal in sheet or panel form through said intermediate spaced areas of tacky adhesive mastic with said non-adhesive creped parchment paper areas lying substantially flat against the surface of the metal or panel.

7. A vibration damped construction comprising metal in sheet or panel form subject to vibration in use and carrying on only limited areas of its surface at least one tape, said tape having a width of about 1 to 2 inches and comprising an aluminum foil tape base carrying a layer of a tacky adhesive mastic about ⅛ to ⅜ inch in thickness and covering essentially the entire width of its surface, said tacky adhesive mastic being provided with overlying areas of non-adhesive creped parchment paper having from 15 to 65 crepe lines per lineal inch, said creped parchment paper covering at least mainly the entire width of the tacky adhesive mastic, said non-adhesive creped parchment paper areas being spaced from each other longitudinally of the tape to leave intermediate spaced areas of said tacky adhesive mastic, said tape being adhered to the aforesaid limited areas of the surface of the metal in sheet or panel form through said intermediate spaced areas of tacky adhesive with said non-adhesive creped parchment paper areas lying substantially flat against the surface of the metal sheet or panel.

8. A sound damping tape for application to panels or the like comprising an elongated, pliable laminate including a continuous, elongated strip of appreciable thickness of a sound dissipative adhesive material, a backing strip adhesively adhered to one side of said strip of sound dissipative adhesive material, a non-adhesive conversion material adhesively adhered to the other side of said strip of sound dissipative adhesive material, the exposed surface of said other side of said strip of sound dissipative adhesive material longitudinally having alternate relatively narrow exposed surfaces of sound dissipative adhesive material and longer exposed surfaces of said non-adhesive conversion material, said alternate exposed surfaces of sound dissipative adhesive material adhesively maintaining the laminate on panels or the like.

9. A sound damping tape wound upon itself in roll form, said tape comprising a layer of a sound dissipative material to a surface of which is adhered a series of areas of non-adhesive conversion material each of which covers at least mainly the entire width of the said surface of said sound dissipative material, said areas of non-adhesive conversion material being spaced from each other longitudinally of the tape to leave intermediate exposed longitudinally spaced areas of sound dissipative material, said intermediate exposed longitudinally spaced areas of sound dissipative material being adhesive-surfaced whereby pieces of said tape may be firmly adhered to a metal surface.

10. A sound damping tape wound upon itself in roll form, said tape comprising a flexible tape base carrying a release coating on its exterior surface and carrying a layer of a sound dissipative material on its interior surface, said sound dissipative material having adhered to its exposed surface a series of areas of non-adhesive creped paper covering at least mainly the entire width of the surface of said sound dissipative material, said creped paper areas being spaced from each other longitudinally of the tape to leave intermediate exposed longitudinally spaced areas of sound dissipative material, said intermediate exposed longitudinally spaced areas being adhesive-surfaced whereby pieces of said tape may be firmly adhered to a metal surface.

11. A sound damping tape wound upon itself in roll form, said tape comprising a metal foil tape base carrying a release coating on its exterior surface and carrying a layer of a tacky adhesive mastic covering essentially the entire width of its interior surface, said tacky adhesive mastic being provided with overlying areas of non-adhesive striated material covering at least the major part of the width of the tacky adhesive mastic, said non-adhesive striated material areas being spaced from each other longitudinally of the tape to leave intermediate exposed longitudinally spaced areas of said tacky adhesive mastic.

12. A sound damping tape wound upon itself in roll form, said tape having a width of about 1 to 2 inches and comprising an aluminum foil tape base carrying a release coating on its exterior surface and carrying a layer of a tacky adhesive mastic about ⅛ to ⅜ inch in thickness and covering essentially the entire width of its interior surface, said tacky adhesive mastic being provided with overlying areas of non-adhesive creped parchment paper having from 15 to 65 crepe lines per linear inch, said creped parchment paper covering at least mainly the entire width of the tacky adhesive mastic, said non-adhesive creped parchment paper areas being spaced from each other longitudinally of the tape to leave intermediate exposed longitudinally spaced areas of said tacky adhesive mastic.

13. A sound damping tape comprising a layer of a sound dissipative material to a surface of which is adhered a series of areas of non-adhesive conversion material each of which covers mainly the entire width of said sound dissipative material having a tacky adhesive exposed surface overlying which are spaced areas of non- of non-adhesive conversion material being spaced from each other longitudinally of the tape to leave intermediate exposed longitudinally spaced areas, said intermediate exposed longitudinally spaced areas being adhesive-surfaced whereby said tape may be firmly adhered to a metal surface.

14. A sound damping tape comprising a flexible tape base carrying a layer of a sound dissipative material covering essentially the entire width of its interior surface, said sound dissipative material having a tacky adhesive exposed surface overlying which are spaced areas of non-adhesive creped paper covering at least mainly the entire width of said sound dissipative material, said creped paper areas being spaced from each other longitudinally of the tape to leave intermediate exposed longitudinally spaced areas of said tacky adhesive.

15. A sound damping tape comprising a metal foil tape base carrying a layer of a tacky adhesive mastic covering essentially the entire width of its surface, said tacky adhesive mastic being provided with overlying areas of non-adhesive striated material covering at least the major part of the width of the tacky adhesive mastic, said non-adhesive striated material areas being spaced from each other longitudinally of the tape to leave intermediate exposed longitudinally spaced areas of said tacky adhesive mastic.

16. A sound damping tape having a width of about 1 to 2 inches and comprising an aluminum foil tape base carrying a layer of a tacky adhesive mastic about ⅛ to ⅜ inch in thickness and covering essentially the entire width of its surface, said tacky adhesive mastic being provided with overlying areas of non-adhesive creped parchment paper covering at least mainly the entire width of the tacky adhesive mastic, said non-adhesive creped parchment paper areas being spaced from each other longitudinally of the tape to leave intermediate exposed longitudinally spaced areas of said tacky adhesive mastic.

References Cited by the Examiner

UNITED STATES PATENTS

| | | | |
|---|---|---|---|
| 1,928,034 | 9/33 | Schulstadt | 161—43 |
| 1,975,918 | 10/34 | Berg | 161—145 |
| 2,116,771 | 5/38 | Seaman | 161—128 |
| 2,196,615 | 4/40 | Surprenant | 189—34 |
| 2,355,568 | 8/44 | Smith | 117—37 |
| 2,486,669 | 11/49 | Nassimbene | 161—133 |
| 2,522,857 | 9/50 | Butler | 161—129 |
| 2,565,509 | 8/51 | Marcin | 206—59 |
| 2,819,032 | 1/58 | Detrie et al. | 244—119 |
| 2,822,290 | 2/58 | Webber | 161—167 |
| 2,914,167 | 11/59 | Holtz | 206—59 |
| 3,028,280 | 4/62 | Hoffman | 161—128 |

ALEXANDER WYMAN, *Primary Examiner.*

EARL M. BERGERT, *Examiner.*